(12) United States Patent
Nakahara (10) Patent No.: US 11,137,583 B2
(45) Date of Patent: Oct. 5, 2021

(54) ZOOM LENS AND IMAGE CAPTURING APPARATUS

(71) Applicant: CANON KABUSHIKI KAISHA, Tokyo (JP)

(72) Inventor: Makoto Nakahara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 192 days.

(21) Appl. No.: 16/418,242

(22) Filed: May 21, 2019

(65) Prior Publication Data

US 2019/0364216 A1    Nov. 28, 2019

(30) Foreign Application Priority Data

May 28, 2018  (JP) .............................. JP2018-101825

(51) Int. Cl.
| | |
|---|---|
| G02B 15/14 | (2006.01) |
| H04N 5/232 | (2006.01) |
| H04N 5/225 | (2006.01) |
| G02B 13/02 | (2006.01) |
| G02B 13/06 | (2006.01) |
| G02B 7/02 | (2021.01) |

(52) U.S. Cl.
CPC ......... *G02B 15/1425* (2019.08); *G02B 7/021* (2013.01); *G02B 13/02* (2013.01); *G02B 13/06* (2013.01); *G02B 15/1465* (2019.08); *G02B 15/143507* (2019.08); *G02B 15/144511* (2019.08); *G02B 15/145511* (2019.08); *H04N 5/2254* (2013.01); *H04N 5/23296* (2013.01)

(58) Field of Classification Search
None
See application file for complete search history.

(56) References Cited

U.S. PATENT DOCUMENTS

| | | | |
|---|---|---|---|
| 8,542,447 B2* | 9/2013 | Eguchi ........... | G02B 15/143103 359/689 |
| 2012/0243107 A1* | 9/2012 | Abe ............... | G02B 15/143507 359/680 |
| 2014/0375870 A1* | 12/2014 | Kawamura .......... | G02B 15/177 348/345 |
| 2016/0154224 A1* | 6/2016 | Imai ..................... | G02B 15/177 359/680 |
| 2016/0170189 A1* | 6/2016 | Fujimoto ............. | G02B 15/163 359/557 |
| 2016/0363743 A1* | 12/2016 | Yoo ....................... | G02B 13/146 |
| 2017/0045720 A1 | 2/2017 | Okumura | |

* cited by examiner

*Primary Examiner* — Darryl J Collins
(74) *Attorney, Agent, or Firm* — Canon U.S.A., Inc. IP Division (57) ABSTRACT

A plurality of lens units of a zoom lens according to an aspect of the embodiments includes a first lens unit having a negative refractive power, and a rear lens group which includes one or more lens units and has a positive refractive power as a whole. The first lens unit consists of a first negative lens, a second negative lens, and a positive lens which are disposed in order from an object side to an image side. A specific gravity of the first negative lens, a focal length of the second negative lens, and a focal length of the first lens unit are appropriately determined.

16 Claims, 9 Drawing Sheets

ZOOM LENS AND IMAGE CAPTURING APPARATUS

BACKGROUND OF THE INVENTION

Field of the Invention

The aspect of the embodiments relates to a zoom lens and an image capturing apparatus.

Description of the Related Art

Zoom lenses used for image capturing apparatuses are required to have a wide view angle and to be compact and lightweight. A negative-lead type zoom lens in which a lens unit having a negative refractive power is disposed on a side closest to an object is known as a zoom lens having a wide view angle.

United States Patent Application Publication No. 2017/0045720 discusses a zoom lens having a configuration in which a first lens unit having a negative refractive power and a second lens unit having a positive refractive power are disposed in order from an object side to an image side.

The outer diameter of the lens unit disposed on the side closest to the object is determined by an off-axis light beam at a wide-angle end. Accordingly, the lens unit tends to become bigger in size and heavier in weight as compared with other lens units. In the lens unit, the incident height of the off-axis light beam at the wide-angle end is high, and thus aberrations such as field curvature and distortion aberration are more likely to occur. Therefore, it is important to appropriately set, especially, the configuration of the first lens unit when the negative-lead type zoom lens is compact and lightweight and has a high optical performance.

SUMMARY OF THE INVENTION

According to an aspect of the embodiments, a zoom lens includes a plurality of lens units in which an interval between adjacent lens units changes during zooming, wherein the plurality of lens units consists of a first lens unit having a negative refractive power and a rear lens group, the rear lens group being disposed on an image side of the first lens unit, including one or more lens units, and having a positive refractive power as a whole, wherein the first lens unit consists of a first negative lens, a second negative lens, and a positive lens which are disposed in order from an object side to the image side. The following conditional expressions are satisfied:

$$2.00 < SG1 < 3.60; \text{ and}$$

$$2.1 < fG2/f1 < 20,$$

where f1 is a focal length of the first lens unit, fG2 is a focal length of the second negative lens, and SG1 is a specific gravity of the first negative lens.

Further features of the disclosure will become apparent from the following description of exemplary embodiments with reference to the attached drawings.

DESCRIPTION OF THE EMBODIMENTS

A zoom lens and an image capturing apparatus according to exemplary embodiments of the disclosure will be described in detail below with reference to the accompanying drawings.

The term "back focus" used herein refers to a distance from a last lens surface (a lens surface closest to an image side) to a paraxial image plane on an optical axis, represented by an air conversion length. The term "overall lens length" refers to a length obtained by adding the back focus to a distance from a frontmost surface (a lens surface closest to an object side) of the zoom lens to the last surface of the zoom lens on the optical axis. The configuration of the "lens unit" is not limited to a configuration consisting of a plurality of lenses, but instead may include a configuration consisting of one lens.

An Abbe number vd of a certain material is expressed by the following expression:

$$vd = (Nd-1)/(NF-NC),$$

where Nd, NF, and NC respectively represent refractive indices at Fraunhofer lines of a d-line (a wavelength of 587.6 nm), an F-line (a wavelength of 486.1 nm), and a C-line (a wavelength of 656.3 nm).

Each zoom lens according to exemplary embodiments is an image-capturing optical system used for an image-capturing apparatus such as a digital video camera, a digital camera, a silver-halide film camera, or a television camera. In sectional views of the zoom lens illustrated in FIGS. 1A and 1B, 3A and 3B, 5A and 5B, and 7A and 7B, the left side corresponds to an object side (front side) and the right side corresponds to an image side (rear side). In the sectional views, assuming that "i" represents the order of a lens unit from the object side to the image side, "Li" represents an i-th lens unit. An aperture stop SP determines (limits) a beam corresponding to a full aperture F-number (Fno). "FP" represents a flare-cutting stop that cuts unnecessary light.

Figure 1A:
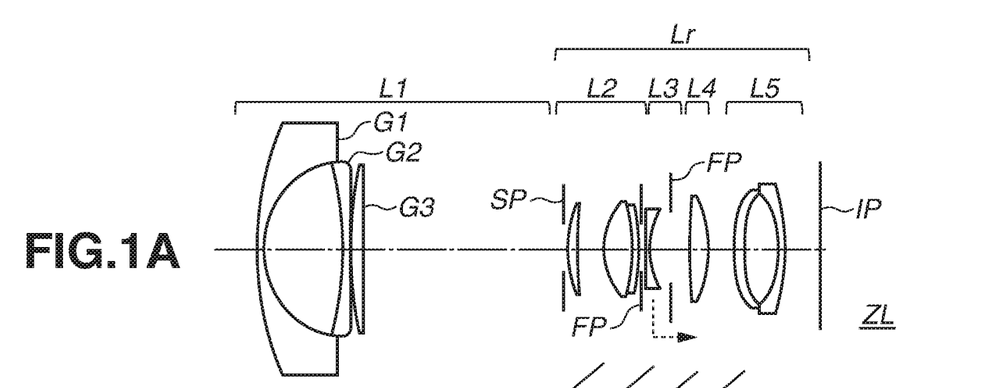
FIG. 1A is a sectional view illustrating a wide-angle end of a zoom lens according to a first exemplary embodiment.
Figure 1B:
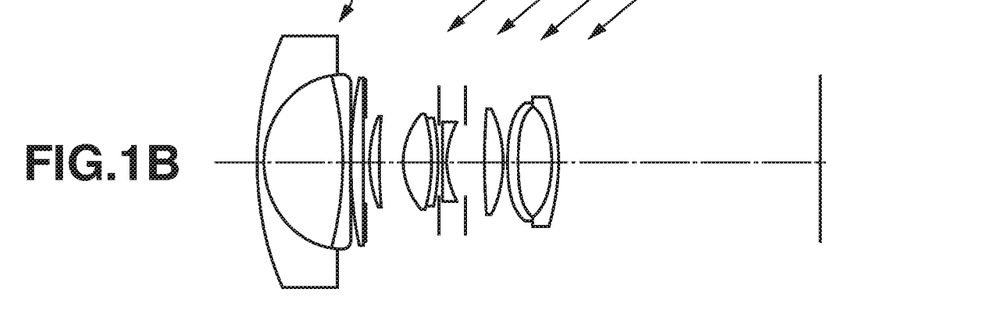
FIG. 1B is a sectional view illustrating a telephoto end of the zoom lens according to the first exemplary embodiment.

During focusing from an infinitely-distant object to a short-distance object, a focus lens unit moves as indicated by a broken-line arrow in FIG. 1. During zooming from a wide-angle end to a telephoto end, each lens unit moves as indicated by solid-line arrows in FIG. 1, and the interval between adjacent lens units changes during zooming. In this case, the wide-angle end indicates a state where the focal length of the zoom lens is shortest, and the telephoto end indicates a state where the focal length of the zoom lens is longest.

In the case of using the zoom lens according to each exemplary embodiment for a digital video camera, a digital camera, or the like, an image plane IP corresponds to an image sensor (photoelectric conversion element) such as a charge-coupled device (CCD) sensor or a complementary metal oxide semiconductor (CMOS) sensor. In the case of using the optical system according to each exemplary embodiment for a silver-halide film camera, the image plane IP corresponds to a film surface.

FIGS. 2A and 2B, 4A and 4B, 6A and 6B, and 8A and 8B are aberration diagrams of the zoom lens according to each exemplary embodiment to be described below. In each spherical aberration diagram, a solid line represents the d-line (a wavelength of 587.6 nm), a broken line represents the F-line (a wavelength of 486.1 nm), a dashed-dotted line represents the C-line (a wavelength of 656.3 nm), and an alternate long and two short dashed line represents a g-line (a wavelength of 435.8 nm). In each astigmatism diagram, a broken line M represents a meridional image plane, and a solid line S represents a sagittal image plane. FIGS. 2A and 2B, 4A and 4B, 6A and 6B, and 8A and 8B each illustrate a distortion aberration for the d-line, and a magnification chromatic aberration for the F-line, the C-line, and the g-line. "ω" represents a half angle of field (degree), and "Fno" represents an F-number.

The zoom lens according to an exemplary embodiment of the disclosure includes a plurality of lens units, and the interval between adjacent lens units changes during zooming. The plurality of lens units consists of a first lens unit having a negative refractive power, and a rear lens group that is disposed on the image side of the first lens unit, includes one or more lens units, and has a positive refractive power as a whole.

A negative-lead type zoom lens which includes the first lens unit having the negative refractive power is capable of introducing light in a wide range with a small front lens effective diameter, and thus the negative-lead type zoom lens is appropriate to widen the angle of view. However, when the angle of view of the zoom lens is widened, aberrations such as field curvature and distortion aberration increase at the wide-angle end. Among the aberrations, the distortion aberration can be electrically corrected in the image capturing apparatus. Accordingly, in the zoom lens, the aberrations can be favorably corrected in the overall camera system by allowing the distortion aberration and appropriately setting the configuration of the first lens unit to correct the field curvature.

The outer diameter of the first lens unit is determined by an off-axis light beam at the wide-angle end. Accordingly, the first lens unit tends to become bigger in size and heavier in weight as compared with other lens units. Therefore, in order to reduce the weight of the zoom lens, the weight of the first lens unit is to be reduced.

The configuration of the first lens unit for implementing the zoom lens that is compact and lightweight and capable of correcting the field curvature will be described below.

In order to reduce the weight of the first lens unit, the number of lenses constituting the first lens unit is reduced. Specifically, the first lens unit consists of a first negative lens, a second negative lens, and a positive lens which are disposed in order from the object side to the image side.

In order to further reduce the weight of the first lens unit, lenses each made of a material having a relatively small specific gravity are used for the first lens unit. However, in general, the material having a small specific gravity tends to have a low refractive index, and thus the refractive power of the first lens unit tends to decrease. Accordingly, if too much weight is put on reducing the weight of the zoom lens, the weight of the zoom lens can be reduced, but it is difficult to sufficiently correct aberrations, such as the field curvature aberration, at the wide-angle end, and to downsize the zoom lens.

The zoom lens according to the present exemplary embodiment is configured to satisfy the following conditional expressions (1) and (2) for the first negative lens and the second negative lens.

$$2.00 < SG1 < 3.60 \tag{1}$$

$$2.10 < fG2/f1 < 20.00 \tag{2}$$

In the conditional expressions (1) and (2), SG1 is the specific gravity of the first negative lens, f1 is the focal length of the first lens unit, and fG2 is the focal length of the second negative lens.

In one embodiment, the conditional expression (1) defines a range of the specific gravity of the first negative lens. In this case, the specific gravity of the material is the ratio of the mass of the material of the first negative lens at a room temperature (15° C. to 25° C.) to the mass of pure water having the same volume as that of the material at 4° C. under a pressure of 101.325 kPa (standard pressure).

The conditional expression (1) indicates that the specific gravity of the first negative lens is set to a relatively small value. When the specific gravity of the first negative lens is lower than a lower limit in the conditional expression (1), a selectable material generally has a low refractive index. This raises a need for increasing the curvature of the surface so as to obtain a necessary refractive power, which is not desirable, because aberrations such as field curvature and distortion aberration increase. When the specific gravity is higher than an upper limit in the conditional expression (1), it is difficult to reduce the weight of the zoom lens, which is not desirable.

The conditional expression (2) defines the ratio of the focal length of the second negative lens to the focal length of the first lens unit. When the focal length of the second negative lens is shorter than the lower limit in the conditional expression (2) and the refractive power of the second negative lens increases, the decentering sensitivity of the second negative lens increases. This makes it difficult to produce the second negative lens, which is not desirable. In particular, when the second negative lens consists of a resin material, a variation in focus or aberration increases with respect to a temperature variation, which is not desirable. When the focal length of the second negative lens is longer than the upper limit in the conditional expression (2) and the refractive power of the second negative lens decreases, it is difficult to correct the field curvature occurring in the first lens unit, which is not desirable.

When the lens units are configured as described above and the conditional expressions (1) and (2) are satisfied, the zoom lens that is compact and lightweight and having a high optical performance while allowing the distortion aberration can be obtained.

In one embodiment, the following numerical ranges in the conditional expressions (1) and (2) are satisfied.

$$2.05 < SG1 < 3.55 \quad (1a)$$

$$2.20 < fG2/f1 < 18.00 \quad (2a)$$

Further, in another embodiment, the following numerical ranges in the conditional expressions (1) and (2) are satisfied.

$$2.10 < SG1 < 3.50 \quad (1b)$$

$$2.3 < fG2/f1 < 15 \quad (2b)$$

Furthermore, the zoom lens is satisfied at least one of the following conditional expressions.

$$1.40 < nd1 < 1.65 \quad (3)$$

$$45.00 < vd1 < 99.00 \quad (4)$$

$$0.50 < SG2 < 2.00 \quad (5)$$

$$0.0001 < d1/TL < 0.20 \quad (6)$$

$$-3.00 < (R2+R1)/(R2-R1) < -0.01 \quad (7)$$

$$10.00 < vdp < 35.00 \quad (8)$$

$$1.60 < ndp < 2.10 \quad (9)$$

In the conditional expressions described above, $nd1$ is the refractive index of the material of the first negative lens with respect to the d-line, $vd1$ is the Abbe number of the material of the first negative lens with reference to the d-line, $SG2$ is the specific gravity of the second negative lens, $d1$ is the distance between the image-side surface of the first negative lens and the object-side surface of the second negative lens on the optical axis, and TL is the overall lens length of the zoom lens at the wide-angle end. $R1$ is the curvature radius of the object-side surface of the first negative lens, $R2$ is the curvature radius of the image-side surface of the first negative lens, $vdp$ is the Abbe number of the material of the positive lens in the first lens unit with reference to the d-line, and $ndp$ is the refractive index of the material of the positive lens with respect to the d-line. Assume that the Abbe number of the material of the positive lens in the first lens unit is smaller than the Abbe number of the material of the first negative lens.

The conditional expression (3) defines the refractive index of the material of the first negative lens. When the refractive index of the material of the first negative lens is lower than the lower limit in the conditional expression (3), it is difficult to correct aberrations such as field curvature and distortion aberration, which is not desirable. When the refractive index of the material of the first negative lens is higher than the upper limit in the conditional expression (3), the weight of a selectable material tends to increase and it is difficult to reduce the weight of the zoom lens, which is not desirable.

The conditional expression (4) defines the Abbe number of the material of the first negative lens. At the wide-angle end, the height of a peripheral beam of the off-axis light beam that passes through the first negative lens is high, so that the magnification chromatic aberration is more likely to occur. Accordingly, in order to correct the magnification chromatic aberration, the Abbe number of the material of the first negative lens is to be relatively large. When the Abbe number of the material of the first negative lens is smaller than the lower limit in the conditional expression (4), it is difficult to correct the magnification chromatic aberration, which is not desirable. When the Abbe number of the material of the first negative lens is greater than the upper limit in the conditional expression (4), the refractive index of a selectable material is generally small. This makes it difficult to correct aberrations such as field curvature and distortion aberration, which is not desirable.

The conditional expression (5) defines the specific gravity of the second negative lens. When the specific gravity is smaller than the lower limit in the conditional expression (5), the refractive index of a selectable material generally decreases. Accordingly, the curvature of the second negative lens is increased to obtain a refractive power, which is not desirable, because aberrations such as field curvature and distortion aberration increase. When the specific gravity is larger than the upper limit in the conditional expression (5), it is difficult to reduce the weight of the zoom lens, which is not desirable.

The conditional expression (6) defines the ratio of the interval between the first negative lens and the second negative lens on the optical axis to the overall lens length of the zoom lens at the wide-angle end. When the interval between the first negative lens and the second negative lens is shorter than the lower limit in the conditional expression (6), the first negative lens and the second negative lens are more likely to interfere with each other in the manufacturing process. As a result, if the surface is damaged, the damage may cause a deterioration in optical characteristics or a deterioration in production yield, which is not desirable. When the interval between the first negative lens and the second negative lens is longer than the upper limit in the conditional expression (6), the length in the optical axis direction of the first lens unit increases. Thus, it is difficult to downsize the zoom lens, which is not desirable.

The conditional expression (7) is a conditional expression that defines the shape of each of the object-side surface and the image-side surface of the first negative lens. In order to downsize the zoom lens and correct the field curvature, the curvature in the first negative lens in which the height at which the peripheral beam of the off-axis light beam passes is high is appropriately set, while the refractive power of each lens constituting the first lens unit is increased, thereby reducing the occurrence of the field curvature. When the refractive power is larger than the upper limit in the conditional expression (7), the curvature of the object-side surface of the first negative lens increases (curvature radius decreases), and thus it is difficult to process the zoom lens in the manufacturing process, which is not desirable. In addition, the field curvature increases, which is not desirable. When the refractive power is smaller than the lower limit in the conditional expression (7), the curvature of the object-side surface of the first negative lens decreases (curvature radius increases), which is not desirable, because it is difficult to increase the field of view of the zoom lens.

The conditional expression (8) defines the Abbe number of the material of the positive lens in the first lens unit. When the Abbe number of the material of the positive lens is set to a relatively small value, the difference between the Abbe number of the material of the positive lens and the Abbe number of the material of the first negative lens increases. Aberrations such as chromatic aberration and field curvature are corrected by the first negative lens and the positive lens in the first lens unit. When the Abbe number of the material of the positive lens in the first lens unit is smaller than the lower limit in the conditional expression (8), the difference between the Abbe number of the material of the first negative lens and the Abbe number of the material of the positive lens increases and the chromatic aberration is excessively corrected in the first lens unit, which is not desirable. When the Abbe number of the material of the positive lens in the first lens unit is greater than the upper limit in the conditional expression (8), the difference between the Abbe number of the material of the positive lens and the Abbe number of the material of the first negative lens decreases and the refractive power of each lens increases, which is not desirable, because it is difficult to correct the chromatic aberration and field curvature.

The conditional expression (9) defines the refractive index of the material of the positive lens in the first lens unit. When the refractive index of the material of the positive lens is smaller than the lower limit in the conditional expression (9), the Petzval sum of the zoom lens increases in a positive direction. This is not desirable because it becomes difficult to correct the field curvature. When the refractive index of the material of the positive lens in the first lens unit is higher than the upper limit in the conditional expression (9), the Abbe number of a selectable material generally tends to increase. Accordingly, the chromatic aberration is excessively corrected in the first lens unit, which is not desirable.

It is desirable to set the following numerical ranges in the conditional expressions (3) to (9).

$$1.42 < nd1 < 1.63 \quad (3a)$$

$$47.00 < vd1 < 95.00 \quad (4a)$$

$$0.60 < SG2 < 1.90 \quad (5a)$$

$$0.0002 < d1/TL < 0.19 \quad (6a)$$

$$-2.80 < (R2+R1)/(R2-R1) < -0.03 \quad (7a)$$

$$11.00 < vdp < 33.00 \quad (8a)$$

$$1.65 < ndp < 2.05 \quad (9a)$$

It is more desirable to set the following numerical ranges in the conditional expressions (3) to (9).

$$1.44 < nd1 < 1.61 \quad (3b)$$

$$50.00 < vd1 < 90.00 \quad (4b)$$

$$0.70 < SG2 < 1.80 \quad (5b)$$

$$0.0003 < d1/TL < 0.18 \quad (6b)$$

$$-2.60 < (R2+R1)/(R2-R1) < -0.05 \quad (7b)$$

$$12.00 < vdp < 31.00 \quad (8b)$$

$$1.70 < ndp < 2.00 \quad (9b)$$

The zoom lens that is compact and lightweight and having a higher optical performance while allowing the distortion aberration can be obtained by satisfying at least one of the conditional expressions described above.

In the zoom lens according to each exemplary embodiment, the second negative lens consists of a resin material. In a case where the second negative lens consists of a resin material, the zoom lens can be manufactured at a low cost. Since the object-side surface is most likely to be exposed during image capturing and thus is liable to be damaged, there is a concern about a deterioration in optical performance when the first negative lens consists of a resin material. However, such deterioration does not occur in the second negative lens. Further, since the diameter of the second negative lens is larger than the diameter of the positive lens in the first lens unit, the weight of the first lens unit can be reduced as compared with a configuration in which only the positive lens in the first lens unit consists of a resin material. Since the refractive power of the second negative lens is small as defined in the conditional expression (2), even when the second negative lens consists of a resin material that is more likely to be deformed due to a temperature variation, variations in aberrations caused by the temperature variation can be reduced as compared with a configuration in which other lenses consist of a resin material.

Furthermore, in the zoom lens according to each exemplary embodiment, at least one of the object-side surface and the image-side surface of the second negative lens have an aspherical shape. An aspherical surface is disposed at a location where the height at which the peripheral beam of the off-axis light beam passes is high, which facilitates the correction of aberrations such as field curvature.

Next, the zoom lens according to each exemplary embodiment of the disclosure will be described.

Figure 2A:
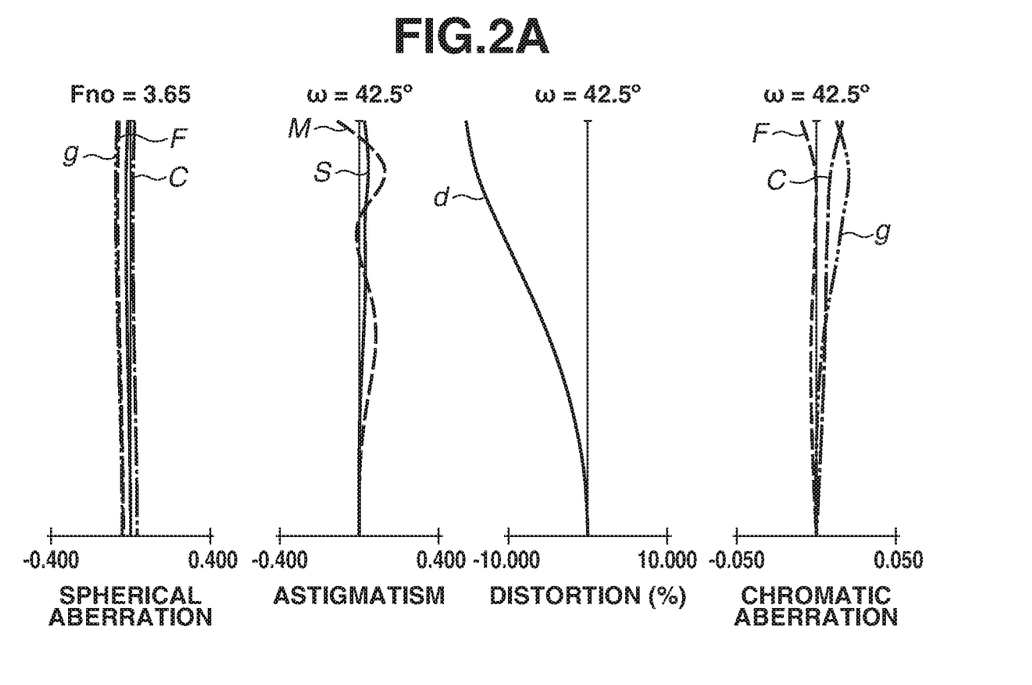
FIG. 2A is an aberration diagram at the wide-angle end of the zoom lens according to the first exemplary embodiment when focusing on an object at infinity.
Figure 2B:
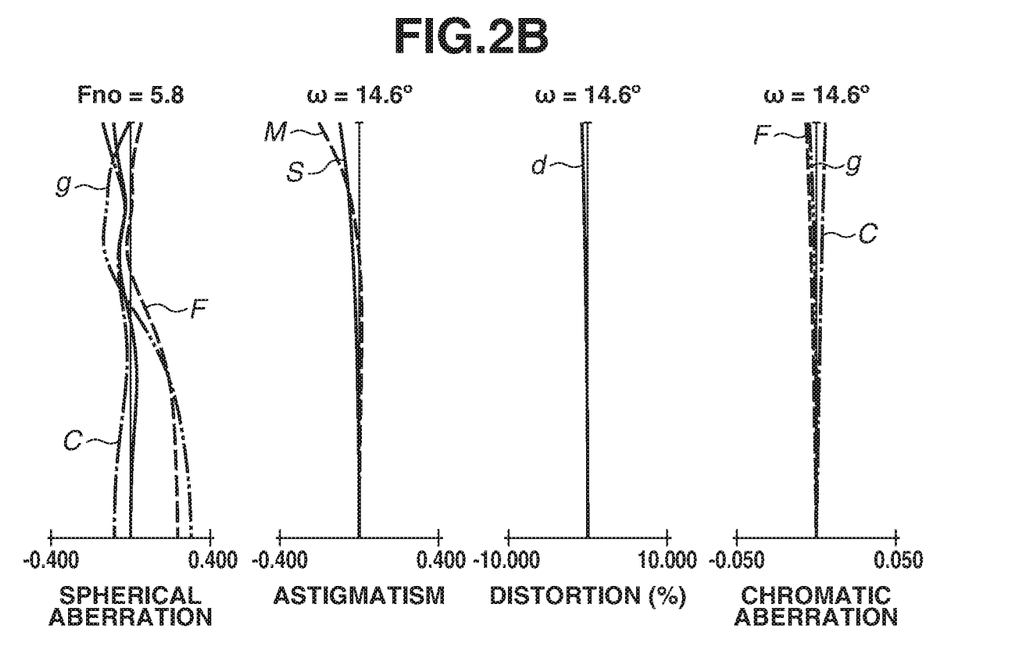
FIG. 2B is an aberration diagram at the telephoto end of the zoom lens according to the first exemplary embodiment when focusing on an object at infinity.

FIG. 1A is a sectional view at a wide-angle end of a zoom lens ZL according to a first exemplary embodiment. FIG. 1B is a sectional view at a telephoto end of the zoom lens ZL according to the first exemplary embodiment. FIG. 2A is an aberration diagram of the zoom lens ZL when focusing on an object at infinity at the wide-angle end. FIG. 2B is an aberration diagram of the zoom lens ZL when focusing on an object at infinity at the telephoto end. The zoom lens ZL according to the first exemplary embodiment is a zoom lens having a zoom ratio of 4.03 and an F-number of 3.65 to 5.80.

The zoom lens ZL according to the first exemplary embodiment includes a plurality of lens units. The plurality of lens units consists of a first lens unit L1 having a negative refractive power, a second lens unit L2 having a positive refractive power, a third lens unit L3 having a negative refractive power, a fourth lens unit L4 having a positive refractive power, and a fifth lens unit L5 having a negative refractive power, which are disposed in order from the object side to the image side. In the present exemplary embodiment, a rear lens group Lr consists of the second lens unit L2, the third lens unit L3, the fourth lens unit L4, and the fifth lens unit L5. The first lens unit L1 consists of a negative lens (first negative lens) G1, a negative lens (second negative lens) G2, and a positive lens G3, which are disposed in order from the object side to the image side.

During zooming from the wide-angle end to the telephoto end, the first lens unit L1 moves to the image side and then moves to the object side, and the second lens unit L2 to the fifth lens unit L5 move to the object side. During focusing from an infinitely-distant object to a short-distance object, the third lens unit L3 moves to the image side.

With the configurations described above, the zoom lens can be reduced in size and weight. Further, as illustrated in aberration diagrams of FIGS. 2A and 2B, the zoom lens having excellent optical characteristics other than the distortion aberration can be obtained.

Figure 3A:
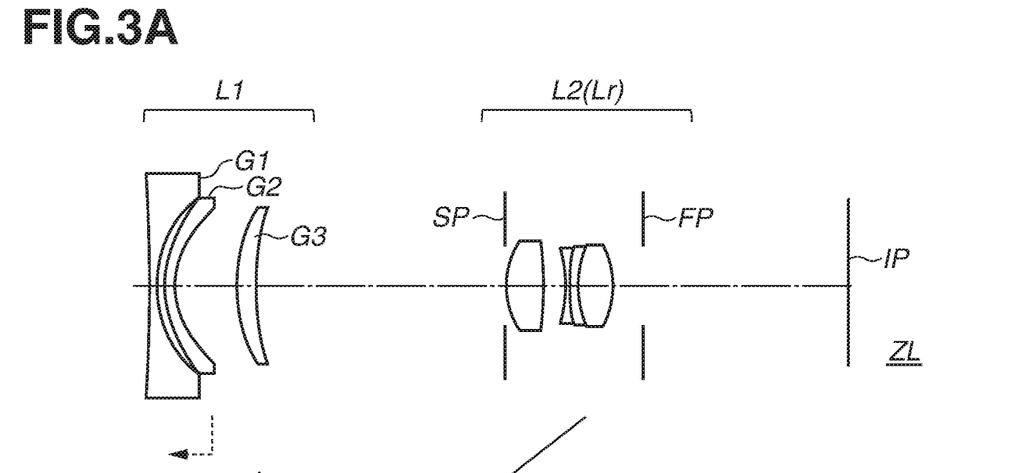
FIG. 3A is a sectional view illustrating a wide-angle end of a zoom lens according to a second exemplary embodiment.
Figure 3B:
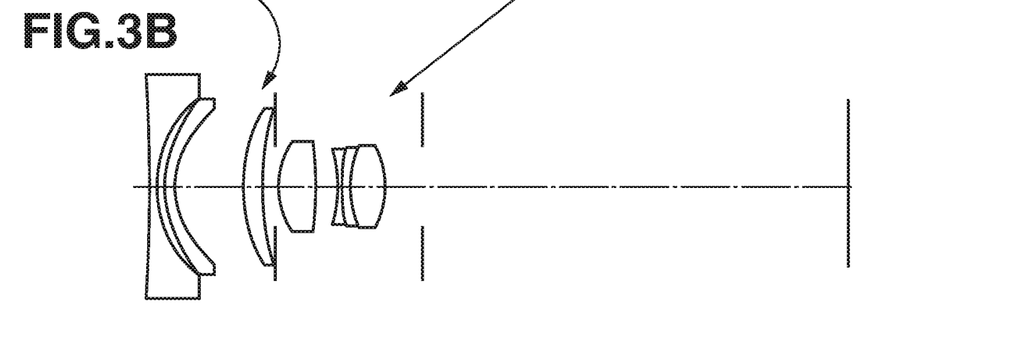
FIG. 3B is a sectional view illustrating a telephoto end of the zoom lens according to the second exemplary embodiment.
Figure 4A:
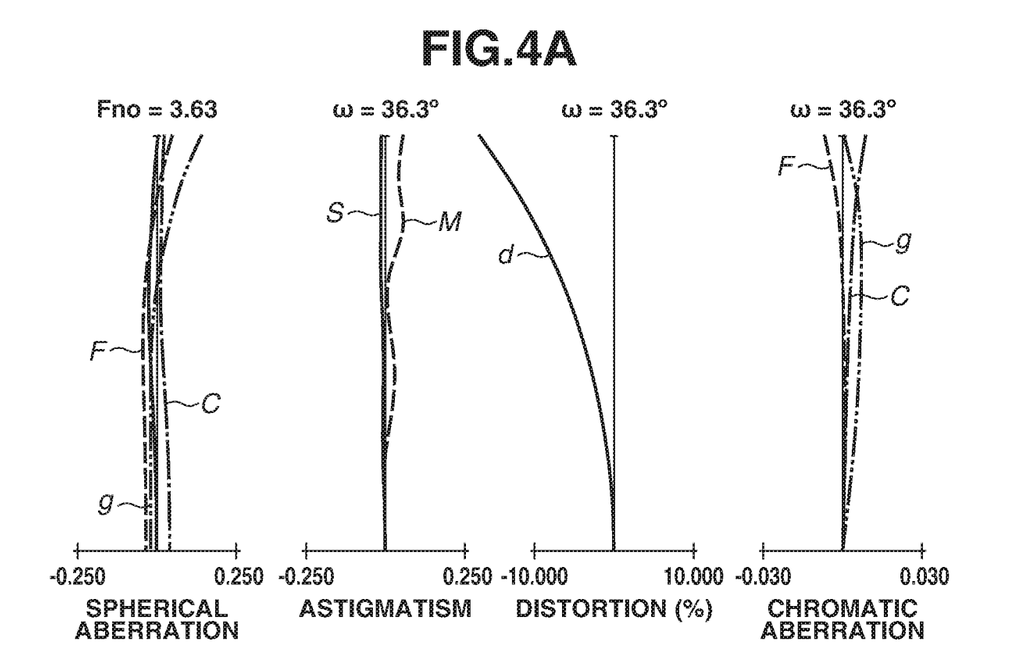
FIG. 4A is an aberration diagram at the wide-angle end of the zoom lens according to the second exemplary embodiment when focusing on an object at infinity.
Figure 4B:
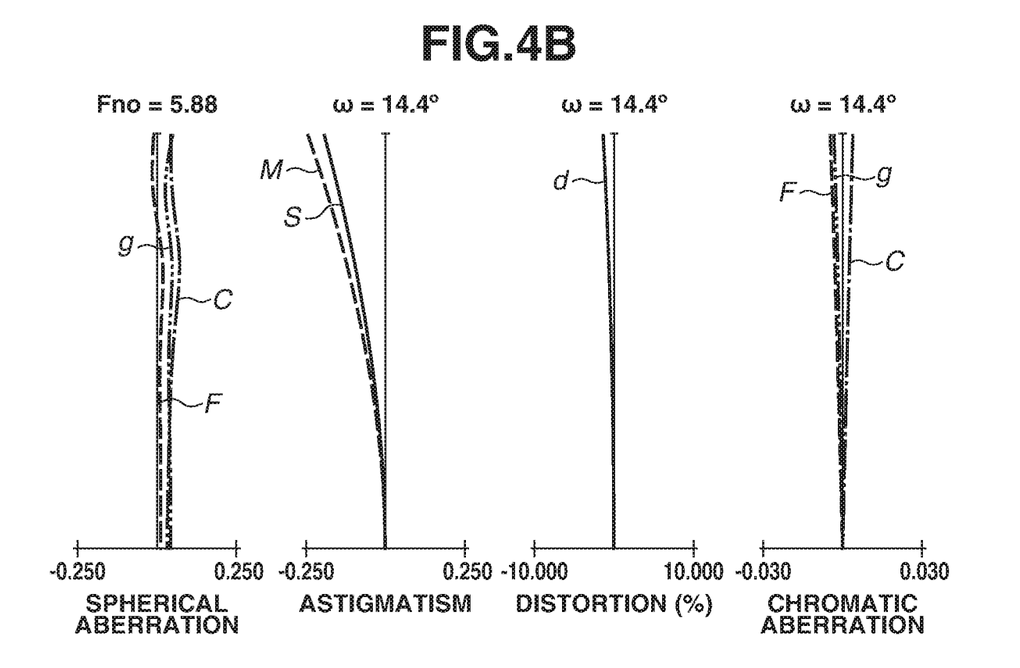
FIG. 4B is an aberration diagram at the telephoto end of the zoom lens according to the second exemplary embodiment when focusing on an object at infinity.

FIG. 3A is a sectional view at the wide-angle end of the zoom lens ZL according to a second exemplary embodiment. FIG. 3B is a sectional view at the telephoto end of the zoom lens ZL according to the second exemplary embodiment. FIG. 4A is an aberration diagram of the zoom lens ZL when focusing on an object at infinity at the wide-angle end. FIG. 4B is an aberration diagram of the zoom lens ZL when focusing on an object at infinity at the telephoto end. The zoom lens ZL according to the second exemplary embodiment is a zoom lens having a zoom ratio of 2.87 and an F-number of 3.63 to 5.88.

The zoom lens ZL according to the second exemplary embodiment includes a plurality of lens units. The plurality of lens units consists of the first lens unit L1 having a negative refractive power and the second lens unit L2 having a positive refractive power, which are disposed in order from the object side to the image side. In the present exemplary embodiment, the rear lens group Lr consists of the second lens unit L2. The first lens unit L1 consists of the negative lens (first negative lens) G1, the negative lens (second negative lens) G2, and the positive lens G3, which are disposed in order from the object side to the image side.

During zooming from the wide-angle end to the telephoto end, the first lens unit L1 moves to the image side and then moves the object side, and the second lens unit L2 moves to the object side. During focusing from an infinitely-distant object to a short-distance object, the first lens unit L1 moves to the object side.

With the configurations described above, the zoom lens can be reduced in size and weight. Further, as illustrated in aberration diagrams of FIGS. 4A and 4B, the zoom lens having excellent optical characteristics other than the distortion aberration can be obtained.

Figure 5A:
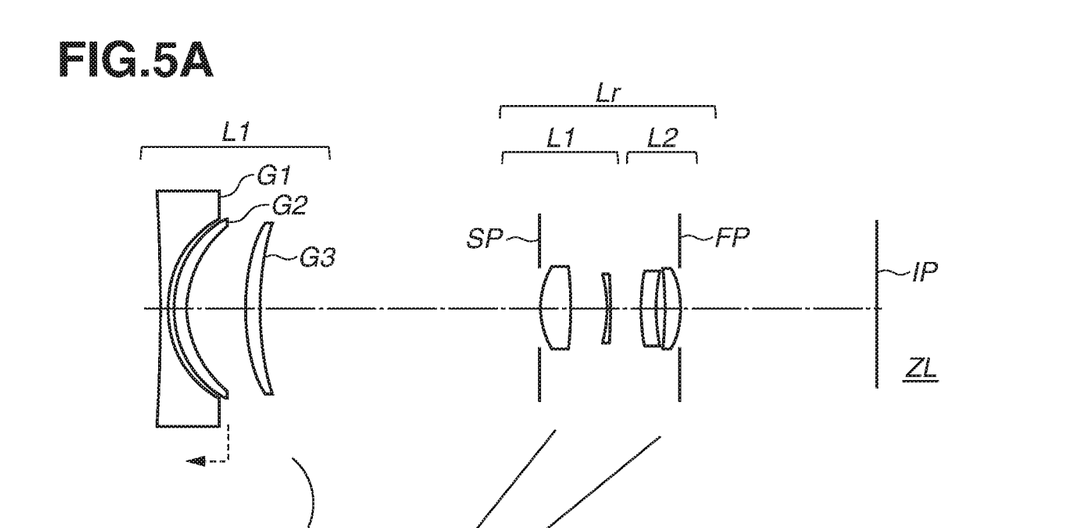
FIG. 5A is a sectional view illustrating a wide-angle end of a zoom lens according to a third exemplary embodiment.
Figure 5B:
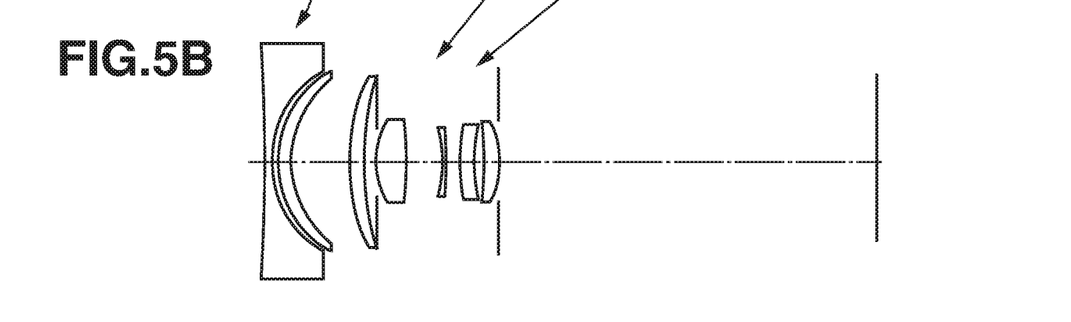
FIG. 5B is a sectional view illustrating a telephoto end of the zoom lens according to the third exemplary embodiment.
Figure 6A:
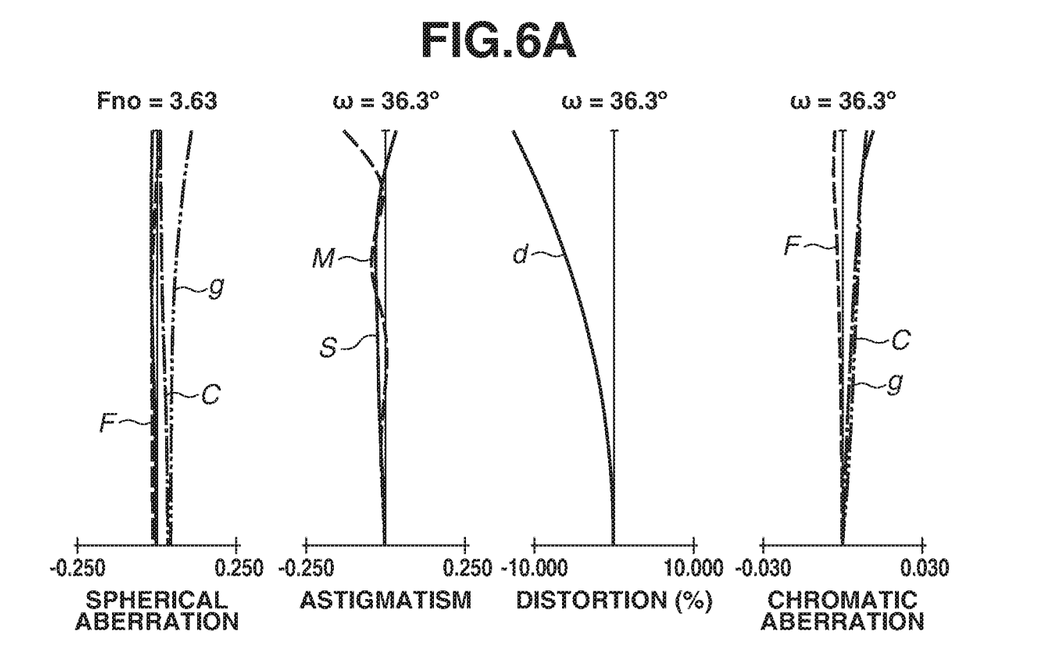
FIG. 6A is an aberration diagram at the wide-angle end of the zoom lens according to the third exemplary embodiment when focusing on an object at infinity.
Figure 6B:
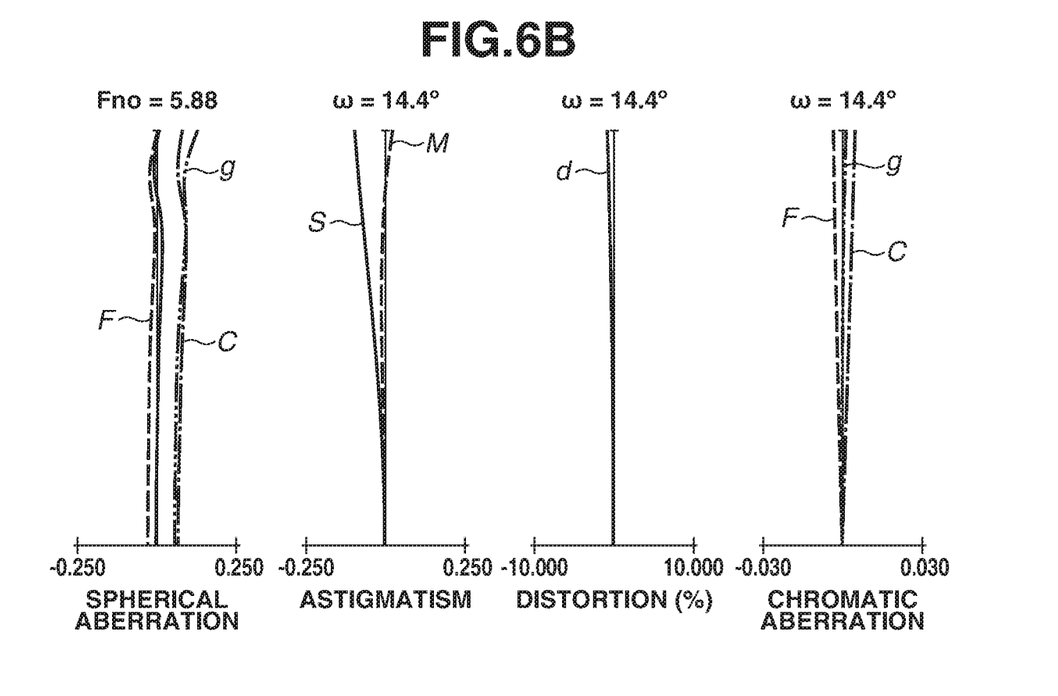
FIG. 6B is an aberration diagram at the telephoto end of the zoom lens according to the third exemplary embodiment when focusing on an object at infinity.

FIG. 5A is a sectional view at the wide-angle end of the zoom lens ZL according to a third exemplary embodiment. FIG. 5B is a sectional view at the telephoto end of the zoom lens ZL according to the third exemplary embodiment. FIG. 6A is an aberration diagram of the zoom lens ZL when focusing on an object at infinity at the wide-angle end. FIG. 6B is an aberration diagram of the zoom lens ZL when focusing on an object at infinity at the telephoto end. The zoom lens ZL according to the third exemplary embodiment is a zoom lens having a zoom ratio of 2.87 and an F-number of 3.63 to 5.88.

The zoom lens ZL according to the third exemplary embodiment includes a plurality of lens units. The plurality of lens units consists of the first lens unit L1 having a negative refractive power, the second lens unit L2 having a positive refractive power, and the third lens unit L3 having a positive refractive power, which are disposed in order from the object side to the image side. The rear lens group Lr consists of the second lens unit L2 and the third lens unit L3. The first lens unit L1 consists of the negative lens (first negative lens) G1, the negative lens (second negative lens) G2, and the positive lens G3, which are disposed in order from the object side to the image side.

During zooming from the wide-angle end to the telephoto end, the first lens unit L1 moves to the image side and then moves to the object side, and the second lens unit L2 and the third lens unit L3 move to the object side. During focusing from an infinitely-distant object to a short-distance object, the first lens unit L1 moves to the object side.

With the configurations described above, the zoom lens can be reduced in size and weight. Further, as illustrated in aberration diagrams of FIGS. 6A and 6B, the zoom lens having excellent optical characteristics other than the distortion aberration can be obtained.

Figure 7A:
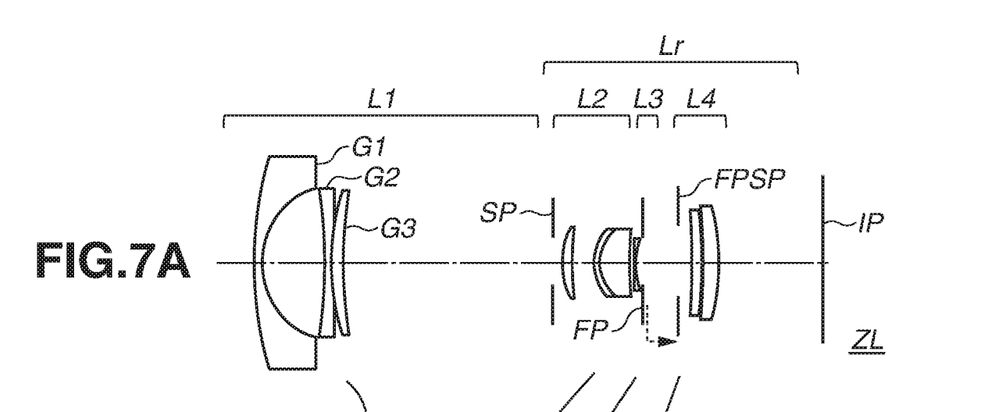
FIG. 7A is a sectional view illustrating a wide-angle end of a zoom lens according to a fourth exemplary embodiment.
Figure 7B:
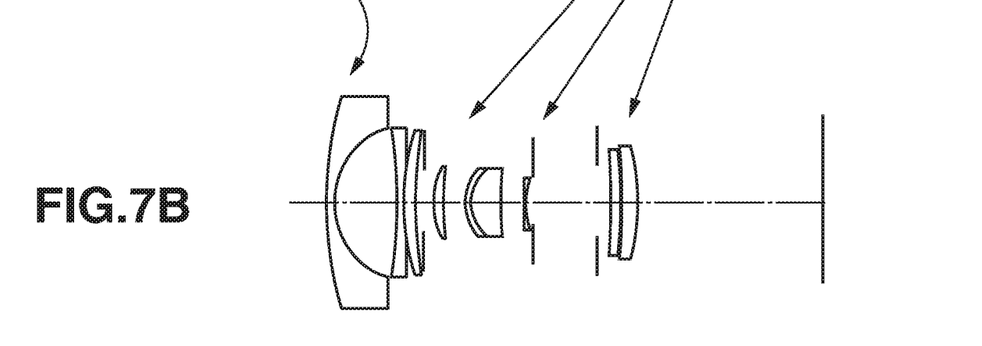
FIG. 7B is a sectional view illustrating a telephoto end of the zoom lens according to the fourth exemplary embodiment.
Figure 8A:
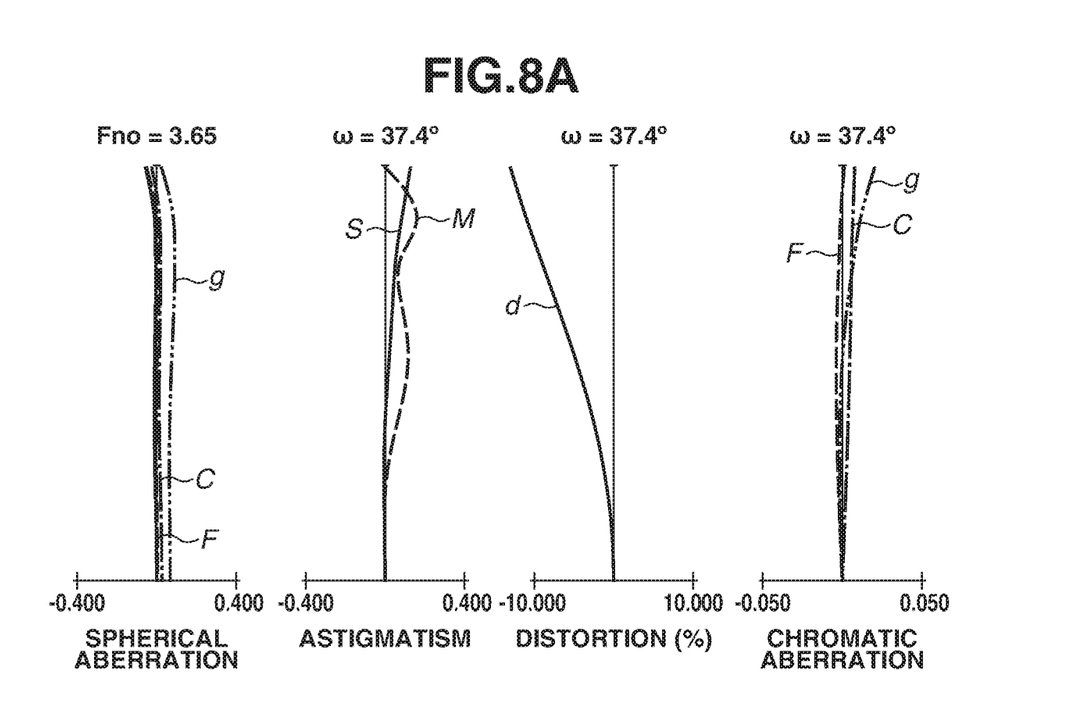
FIG. 8A is an aberration diagram at the wide-angle end of the zoom lens according to the fourth exemplary embodiment when focusing on an object at infinity.
Figure 8B:
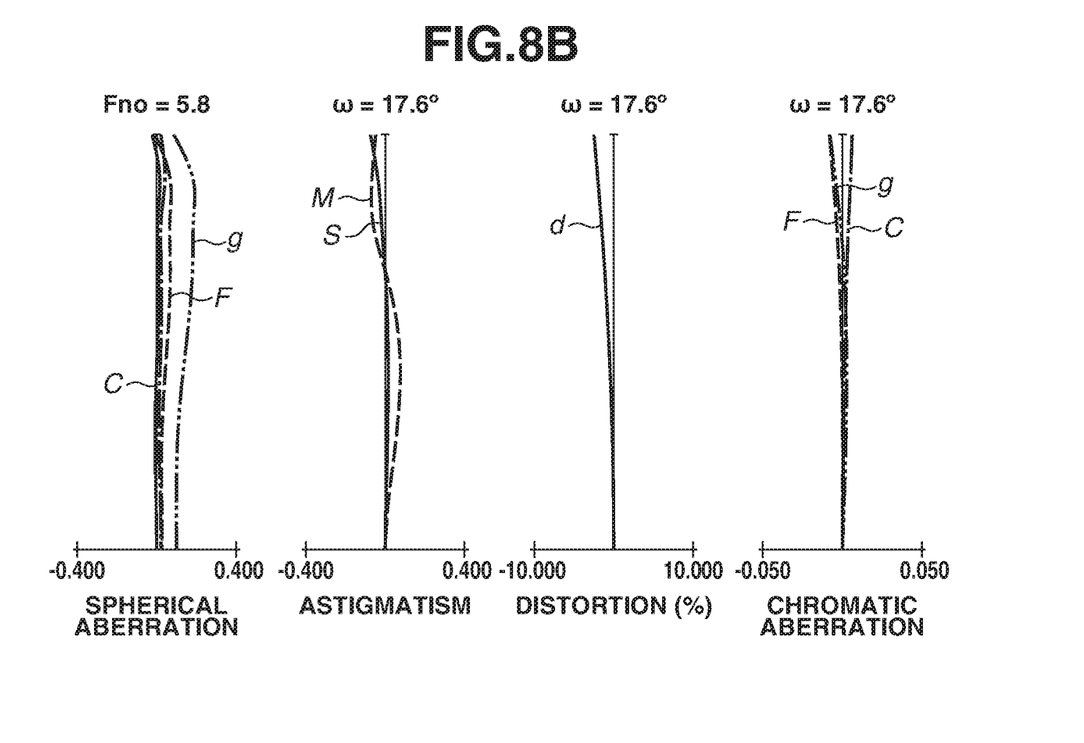
FIG. 8B is an aberration diagram at the telephoto end of the zoom lens according to the fourth exemplary embodiment when focusing on an object at infinity.

FIG. 7A is a sectional view at the wide-angle end of the zoom lens ZL according to a fourth exemplary embodiment. FIG. 7B is a sectional view at the telephoto end of the zoom lens ZL according to the fourth exemplary embodiment. FIG. 8A is an aberration diagram of the zoom lens ZL when focusing on an object at infinity at the wide-angle end. FIG. 8B is an aberration diagram of the zoom lens ZL when focusing on an object at infinity at the telephoto end. The zoom lens ZL according to the fourth exemplary embodiment is a zoom lens having a zoom ratio of 2.75 and an F-number of 3.65 to 5.80.

The zoom lens ZL according to the fourth exemplary embodiment includes a plurality of lens units. The plurality of lens units consists of the first lens unit L1 having a negative refractive power, the second lens unit L2 having a positive refractive power, the third lens unit L3 having a negative refractive power, and the fourth lens unit L4 having a positive refractive power, which are disposed in order from the object side to the image side. In the present exemplary embodiment, the rear lens group Lr consists of the second lens unit L2, the third lens unit L3, and the fourth lens unit L4. The first lens unit L1 consists of the negative lens (first negative lens) G1, the negative lens (second negative lens) G2, and the positive lens G3, which are disposed in order from the object side to the image side.

During zooming from the wide-angle end to the telephoto end, the first lens unit L1 moves to the image side and then moves to the object side, and the second lens unit L2, the third lens unit L3, and the fourth lens unit L4 move to the object side. During focusing from an infinitely-distant object to a short-distance object, the third lens unit L3 moves to the image side.

With the configurations described above, the zoom lens can be reduced in size and weight. Further, as illustrated in aberration diagrams of FIGS. 8A and 8B, the zoom lens having excellent optical characteristics other than the distortion aberration can be obtained.

The zoom lens according to exemplary embodiments of disclosure has been described above. However, the zoom lens according to the disclosure is not limited to the exemplary embodiments described above, and can be modified or altered in various ways within the scope of the disclosure.

NUMERICAL EXAMPLES

Numerical Examples 1 to 4 corresponding to the first to fourth exemplary embodiments, respectively, are described below. In Numerical Examples 1 to 4, each surface number indicates the order of an optical surface counted from the object side. "r" represents the curvature radius (mm) of the optical surface. At the surface number "i", "d" represents the interval (mm) between the i-th optical surface and the (i+1)th optical surface, "nd" represents the refractive index of the material of the optical member with respect to the d-line, and "vd" represents the Abbe number of the material of the optical member with reference to the d-line. These are defined in the above description. "BF" represents a back focus.

When the optical surface is an aspherical surface, "*" is added to the right side of each surface number. The aspherical shape is expressed by the following expression:

$$x=(h^2/R)/[1+\{1-(1+k)(h/R)^2\}^{1/2}+A4 \times h^4+A6 \times h^6+A8 \times h^8+A10 \times +A12 \times h^{12},$$

where "x" represents a displacement amount from a surface vertex in the optical axis direction, "h" represents a height from the optical axis in a direction perpendicular to the optical axis, "R" represents a paraxial curvature radius, "k" represents a conic constant, and A4, A6, A8, A10, and A12 each represent an aspherical coefficient of each other. In this expression, "e±XX" in each aspherical coefficient indicates "$\times 10^{\pm XX}$". Physical quantities used for the conditional expressions described above in Numerical Examples 1 to 4 are illustrated in [Table 1], and the values corresponding to the respective conditional expressions described above are illustrated in [Table 2].

Numerical Example 1

Units: mm
Surface data

| Surface number | r | d | nd | vd |
|---|---|---|---|---|
| 1 | 78.919 | 1.76 | 1.59349 | 67.0 |
| 2 | 22.313 | 20.21 | | |
| 3* | −91.148 | 2.00 | 1.52996 | 55.8 |
| 4* | 211.982 | 0.15 | | |
| 5 | 98.769 | 3.06 | 1.92286 | 18.9 |
| 6 | 523.221 | (variable) | | |
| 7 (stop) | ∞ | 1.11 | | |
| 8 | 30.236 | 2.44 | 1.43875 | 94.7 |
| 9 | 94.436 | 6.77 | | |
| 10 | 17.405 | 7.25 | 1.43875 | 94.7 |
| 11 | −48.540 | 0.15 | | |
| 12* | −72.393 | 1.72 | 1.69680 | 55.5 |
| 13* | −51.407 | 0.50 | | |
| 14 | ∞ | (variable) | | |
| 15 | 741.421 | 0.70 | 1.85025 | 30.1 |
| 16 | 19.630 | 5.88 | | |
| 17 | ∞ | (variable) | | |
| 18 | 78.348 | 5.13 | 1.59270 | 35.3 |
| 19 | −27.791 | (variable) | | |
| 20* | 80.319 | 2.50 | 1.52996 | 55.8 |
| 21* | 61.429 | 9.22 | | |
| 22 | −21.575 | 1.30 | 1.80610 | 40.9 |
| 23 | −58.018 | (variable) | | |
| image plane | ∞ | | | |

Aspherical surface data

Third surface
K = 0.00000e+000 A4 = 5.57735e−006 A6 = −4.23140e−008
A8 = 9.37701e−011 A10 = −1.93623e−014 A12 = −8.37621e−017
Fourth surface
K = 0.00000e+000 A4 = 1.46115e−006 A6 = −4.39763e−008
A8 = 8.12741e−011 A10 = 2.53530e−014 A12 = −1.70992e−016
12th surface
K = 0.00000e+000 A4 = −7.86030e−005 A6 = 2.75306e−007
A8 = 4.71828e−009 A10 = −3.73239e−011 A12 = 8.21570e−014
13th surface
K = 0.00000e+000 A4 = −4.18004e−005 A6 = 3.35351e−007
A8 = 3.77339e−009 A10 = −3.11773e−011 A12 = 7.09781e−014
20th surface
K = 0.00000e+000 A4 = 3.10668e−005 A6 = 1.27895e−007
A8 = −1.29560e−009 A10 = 1.02484e−011 A12 = −1.87500e−014
21st surface
K = 0.00000e+000 A4 = 2.54527e−005 A6 = 1.27013e−007
A8 = −1.31732e−009 A10 = 9.96190e−012 A12 = −7.65908e−015

Various data
Zoom ratio: 4.03

| | wide angle | intermediate | telephoto |
|---|---|---|---|
| focal length | 20.61 | 43.52 | 83.00 |
| F-number | 3.65 | 5.60 | 5.80 |
| half angle of field (degree) | 42.52 | 25.76 | 14.61 |
| image height | 18.90 | 21.00 | 21.64 |
| overall lens length | 144.78 | 134.16 | 149.20 |
| BF | 9.10 | 34.75 | 70.08 |
| d6 | 51.55 | 19.68 | 0.89 |
| d14 | 1.38 | 0.66 | 0.50 |
| d17 | 4.31 | 5.04 | 5.03 |
| d19 | 6.60 | 2.18 | 0.85 |
| d23 | 9.10 | 34.75 | 70.8 |

Zoom lens unit data

| Unit | Starting surface | Focal length |
|---|---|---|
| 1 | 1 | −50.76 |
| 2 | 7 | 23.80 |
| 3 | 15 | −23.73 |
| 4 | 18 | 35.25 |
| 5 | 20 | −39.72 |

Numerical Example 2

Units: mm
Surface data

| Surface number | r | d | nd | vd |
|---|---|---|---|---|
| 1 | −382.346 | 1.30 | 1.60311 | 60.6 |
| 2 | 21.029 | 1.50 | | |
| 3* | 18.152 | 2.00 | 1.53110 | 55.9 |
| 4* | 13.043 | 11.60 | | |
| 5 | 29.859 | 3.40 | 1.84666 | 23.8 |
| 6 | 42.351 | (variable) | | |
| 7 (stop) | ∞ | 0.26 | | |
| 8 | 14.772 | 7.00 | 1.48749 | 70.2 |
| 9 | −65.066 | 4.07 | | |
| 10 | −22.712 | 0.55 | 1.78590 | 44.2 |
| 11 | 22.720 | 0.34 | | |
| 12* | 21.253 | 1.56 | 1.53110 | 55.9 |
| 13* | 17.930 | 0.14 | | |
| 14 | 19.143 | 6.07 | 1.49700 | 81.5 |
| 15 | −15.847 | 5.71 | | |
| 16 | ∞ | (variable) | | |
| image plane | ∞ | | | |

Aspherical surface data

Third surface
K = 0.00000e+000 A4 = −6.25403e−005 A6 = 3.71513e−007
A8 = −3.02162e−009
A10 = 1.14069e−011 A12 = −1.76153e−014
Fourth surface
K = −4.12921e−001 A4 = −8.34139e−005 A6 = 4.54675e−007
A8 = −4.77398e−009
A10 = 2.10330e−011 A12 = −3.88298e−014
12th surface
K = 0.00000e+000 A4 = −1.21499e−004 A6 = −7.49459e−007
A8 = −1.74915e−008
A10 = 6.85768e−010 A12 = −4.95317e−012
13th surface
K = 0.00000e+000 A4 = −3.14317e−005 A6 = −7.50425e−007
A8 = −1.05703e−008
A10 = 5.51780e−010 A12 = −4.20985e−012

Various data
Zoom ratio: 2.87

| | wide angle | intermediate | telephoto |
|---|---|---|---|
| focal length | 18.60 | 34.00 | 53.35 |
| F-number | 3.63 | 5.88 | 5.88 |
| half angle of field (degree) | 36.29 | 21.89 | 14.36 |
| image height | 13.66 | 13.66 | 13.66 |
| overall lens length | 130.32 | 116.40 | 123.98 |
| BF | 38.39 | 55.11 | 76.11 |

-continued

| | | | |
|---|---|---|---|
| d6 | 46.41 | 15.78 | 2.36 |
| d16 | 38.39 | 55.11 | 76.11 |

Zoom lens unit data

| Unit | Starting surface | Focal length |
|---|---|---|
| 1 | 1 | −34.05 |
| 2 | 7 | 36.96 |

Numerical Example 3

Units: mm
Surface data

| Surface number | r | d | nd | vd |
|---|---|---|---|---|
| 1 | −224.165 | 1.50 | 1.59349 | 67.0 |
| 2 | 21.217 | 1.01 | | |
| 3* | 18.508 | 2.30 | 1.53110 | 55.9 |
| 4* | 15.081 | 11.36 | | |
| 5 | 36.541 | 3.03 | 1.84666 | 23.8 |
| 6 | 55.499 | (variable) | | |
| 7 (stop) | ∞ | 0.11 | | |
| 8 | 19.754 | 6.00 | 1.49700 | 81.5 |
| 9 | −56.443 | 7.33 | | |
| 10 | −21.021 | 0.55 | 1.80000 | 29.8 |
| 11 | −98.700 | (variable) | | |
| 12* | 27.239 | 3.00 | 1.53110 | 55.9 |
| 13* | 26.032 | 1.77 | | |
| 14 | −80.035 | 3.10 | 1.48749 | 70.2 |
| 15 | −16.557 | 0.10 | | |
| 16 | ∞ | (variable) | | |
| image plane | ∞ | | | |

Aspherical surface data

Third surface
K = 0.00000e+000 A4 = −3.48534e−005 A6 = 7.57790e−008
A8 = −8.37993e−010
A10 = 3.58698e−012 A12 = −5.66764e−015
Fourth surface
K = −2.79824e−001 A4 = −5.36578e−005 A6 = 8.26563e−008
A8 =−1.29623e−009
A10 = 6.02379e−012 A12 = −1.10810e−014
12th surface
K = 0.00000e+000 A4 = −6.61953e−005 A6 = −4.14241e−007
A8 =−7.76525e−009
A10 = 1.95146e−010 A12 = −1.57027e−012
13th surface
K = 0.00000e+000 A4 = −1.85266e−005 A6 = −4.71949e−007
A8 = −6.57076e−009
A10 = 1.76371e−010 A12 = −1.28842e−012

Various data
Zoom ratio: 2.87

| | wide angle | intermediate | telephoto |
|---|---|---|---|
| focal length | 18.60 | 36.00 | 53.35 |
| F-number | 3.63 | 5.88 | 5.88 |
| half angle of field (degree) | 36.29 | 20.78 | 14.36 |
| image height | 13.66 | 13.66 | 13.66 |
| overall lens length | 140.83 | 116.87 | 120.00 |
| BF | 38.56 | 56.39 | 73.67 |
| d6 | 54.99 | 15.50 | 2.37 |
| d11 | 6.11 | 3.82 | 2.80 |
| d16 | 38.56 | 56.39 | 73.67 |

Zoom lens unit data

| Unit | Starting surface | Focal length |
|---|---|---|
| 1 | 1 | −38.45 |
| 2 | 7 | 74.72 |
| 3 | 12 | 44.04 |

Numerical Example 4

Units: mm
Surface data

| Surface number | r | d | nd | vd |
|---|---|---|---|---|
| 1 | 112.989 | 1.76 | 1.51633 | 64.1 |
| 2 | 21.052 | 16.19 | | |
| 3* | −183.246 | 2.00 | 1.52996 | 55.8 |
| 4* | 82.014 | 0.15 | | |
| 5 | 63.524 | 3.15 | 1.92119 | 24.0 |
| 6 | 132.980 | (variable) | | |
| 7 (stop) | ∞ | 2.81 | | |
| 8 | 19.087 | 2.44 | 1.61800 | 63.4 |
| 9 | 44.966 | 6.09 | | |
| 10 | 14.328 | 1.10 | 1.90043 | 37.4 |
| 11 | 9.867 | 8.20 | 1.49710 | 81.6 |
| 12* | 193.670 | (variable) | | |
| 13 | 89.175 | 0.70 | 1.67003 | 47.2 |
| 14 | 18.211 | 1.30 | | |
| 15 | ∞ | (variable) | | |
| 16 | ∞ | 3.29 | | |
| 17* | −430.822 | 3.00 | 1.52996 | 55.8 |
| 18* | −154.517 | 0.27 | | |
| 19 | −131.167 | 3.97 | 1.69680 | 55.5 |
| 20 | −60.117 | (variable) | | |
| image plane | ∞ | | | |

Aspherical surface data

Third surface
K = 0.00000e+000 A4 = −1.11604e−005 A6 = 3.92586e−008
A8 = −4.74596e−011
A10 = 2.79045e−014 A12 = −6.76729e−017
Fourth surface
K = 0.00000e+000 A4 = −1.58549e−005 A6 = 4.02828e− 008
A8 = −7.80026e−011
A10 = 7.50653e−014 A12 = −1.50788e−016
12th surface
K = 0.00000e+000 A4 = 5.75528e−005 A6 = 3.40033e−008
A8 = −3.37062e−009 A10 = 6.91212e−011 A12 = −5.58378e−013
17th surface
K = 0.00000e+000 A4 = −2.53825e−005 A6 = 1.89925e−007
A8 = −1.11554e−009
A10 = 6.95886e−012 A12 = −1.47603e−014
18th surface
K = 0.00000e+000 A4 = −2.86938e−005 A6 = 1.42511e−007
A8 = −8.00607e−010
A10 = 4.50593e−012 A12 = −7.89411e−015

Various data
Zoom ratio: 2.75

| | wide angle | intermediate | telephoto |
|---|---|---|---|
| focal length | 24.70 | 42.24 | 68.00 |
| F-number | 3.65 | 5.60 | 5.80 |
| half angle of field (degree) | 37.42 | 26.43 | 17.65 |
| image height | 18.90 | 21.00 | 21.64 |
| overall lens length | 149.70 | 126.15 | 127.97 |
| BF | 27.45 | 31.48 | 47.40 |
| d6 | 54.99 | 19.93 | 1.68 |
| d12 | 1.04 | 3.67 | 5.37 |
| d15 | 9.80 | 14.67 | 17.11 |
| d20 | 27.45 | 31.48 | 47.40 |

Zoom lens unit data

-continued

| Unit | Starting surface | Focal length |
| --- | --- | --- |
| 1 | 1 | −44.96 |
| 2 | 7 | 26.43 |
| 3 | 13 | −34.29 |
| 4 | 16 | 116.52 |

TABLE 1

| Conditional expression | First exemplary embodiment | Second exemplary embodiment | Third exemplary embodiment | Fourth exemplary embodiment |
| --- | --- | --- | --- | --- |
| f1 | −50.76 | −34.05 | −38.45 | −44.96 |
| fG2 | −120.00 | −100.95 | −199.94 | −106.63 |
| SG1 | 3.14 | 3.43 | 3.14 | 2.52 |
| nd1 | 1.59 | 1.60 | 1.59 | 1.52 |
| vd1 | 67.00 | 60.64 | 67.00 | 64.14 |
| SG2 | 1.02 | 1.02 | 1.02 | 1.02 |
| d1 | 20.21 | 1.50 | 1.01 | 16.19 |
| TL | 144.78 | 130.32 | 140.83 | 144.78 |
| r1 | 78.92 | −382.35 | −224.17 | 112.99 |
| r2 | 22.31 | 21.03 | 21.22 | 21.05 |
| vdp | 18.90 | 23.78 | 23.78 | 23.96 |
| ndp | 1.92 | 1.85 | 1.85 | 1.92 |

TABLE 2

| Conditional expression | First exemplary embodiment | Second exemplary embodiment | Third exemplary embodiment | Fourth exemplary embodiment |
| --- | --- | --- | --- | --- |
| (1) | 3.14 | 3.43 | 3.14 | 2.52 |
| (2) | 2.36 | 2.97 | 5.20 | 2.37 |
| (3) | 1.59 | 1.60 | 1.59 | 1.52 |
| (4) | 67.00 | 60.64 | 67.00 | 64.14 |
| (5) | 1.02 | 1.02 | 1.02 | 1.02 |
| (6) | 0.14 | 0.01 | 0.01 | 0.11 |
| (7) | −1.79 | −0.90 | −0.83 | −1.46 |
| (8) | 18.90 | 23.78 | 23.78 | 23.96 |
| (9) | 1.92 | 1.85 | 1.85 | 1.92 |

Figure 9:
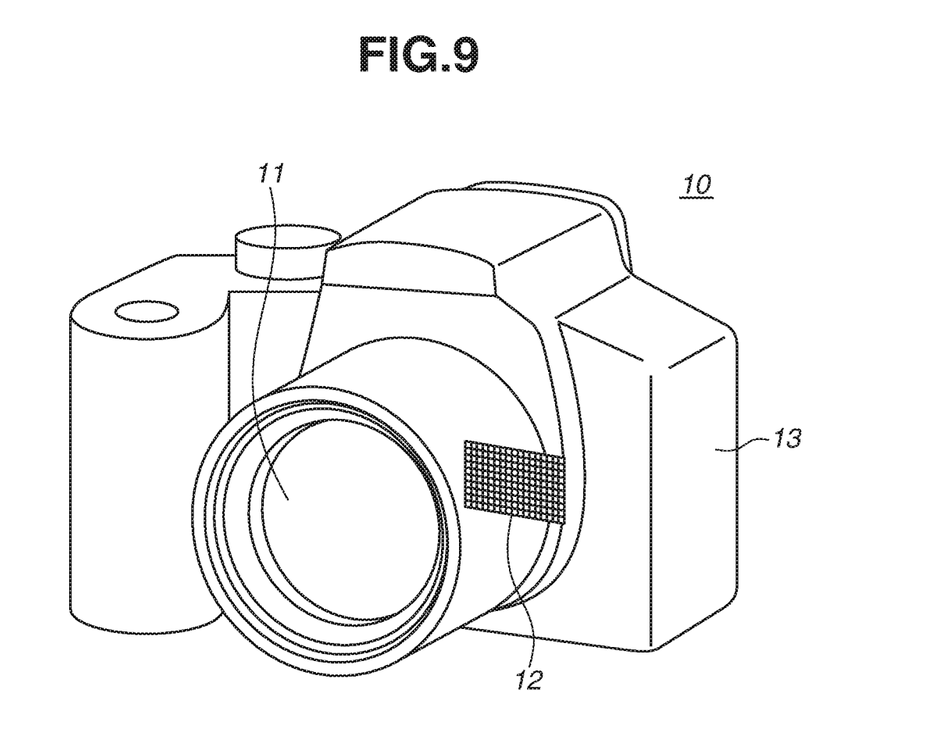
FIG. 9 is a schematic view illustrating a configuration of an image capturing apparatus according to an exemplary embodiment of the disclosure.

Next, an image capturing apparatus according to an exemplary embodiment of the disclosure will be described with reference to FIG. 9. FIG. 9 is a schematic view of an image capturing apparatus 10. The image capturing apparatus 10 includes a camera body 13, a lens apparatus 11 including the zoom lens ZL, which has a configuration similar to any one of the first to fourth exemplary embodiments described above, and a light-receiving element (image sensor) 12 that photoelectrically converts an image formed by the zoom lens ZL. As the light-receiving element 12, an image sensor such as a CCD sensor or a CMOS sensor can be used. The lens apparatus 11 and the camera body 13 may be integrally formed, or may be configured to be detachable from each other. Since the image capturing apparatus 10 according to the present exemplary embodiment includes the lens apparatus 11, the image capturing apparatus 10 is compact and lightweight and has a high optical performance.

In the image capturing apparatus 10 of one embodiment, the effective image circle diameter at the wide-angle end is smaller than the effective image circle diameter at the telephoto end. Further, the image capturing apparatus 10, in another embodiment, has a function for electrically correcting the distortion aberration, which occurs in a captured image, by using correction data in accordance with the optical characteristics of the zoom lens ZL of the lens apparatus 11.

The lens apparatus according to each exemplary embodiment described above is not limited to a digital still camera illustrated in FIG. 9, but also is applicable to various image capturing apparatuses, such as a broadcasting camera, a silver-halide film camera, and a monitoring camera.

While exemplary embodiments of the disclosure have been described above, the disclosure is not limited to the exemplary embodiments. Various combinations, modifications, and alterations can be made within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-101825, filed May 28, 2018, which is hereby incorporated by reference herein in its entirety.

What is claimed is:

1. A zoom lens comprising a plurality of lens units configured such that an interval between adjacent lens units changes during zooming,
   wherein the plurality of lens units consists of a first lens unit having a negative refractive power and a rear lens group, the rear lens group being disposed on an image side of the first lens unit, including one or more lens units, and having a positive refractive power as a whole,
   wherein the first lens unit consists of a first negative lens, a second negative lens, and a positive lens which are disposed in order from an object side to the image side, and
   wherein the following conditional expressions are satisfied:

$$2.00 < SG1 < 3.60;$$

$$2.1 < fG2/f1 < 20; \text{ and}$$

$$1.40 < nd1 < 1.65,$$

where f1 is a focal length of the first lens unit, fG2 is a focal length of the second negative lens, SG1 is a specific gravity of the first negative lens, and nd1 is a refractive index of a material of the first negative lens with respect to a d-line.

2. The zoom lens according to claim 1, wherein the following conditional expression is satisfied:

$$45 < vd1 < 99,$$

where vd1 is an Abbe number of a material of the first negative lens with reference to a d-line.

3. The zoom lens according to claim 1, wherein the following conditional expression is satisfied:

$$0.5 < SG2 < 2.0,$$

where SG2 is a specific gravity of the second negative lens.

4. The zoom lens according to claim 1, wherein the following conditional expression is satisfied:

$$0.0001 < d1/TL < 0.20,$$

where d1 is a distance between an image-side surface of the first negative lens and an object-side surface of the second negative lens on an optical axis, and TL is an overall lens length of the zoom lens at a wide-angle end.

5. The zoom lens according to claim 1, wherein each of an object-side surface of the first negative lens and an image-side surface of the first negative lens is a spherical surface, and the following conditional expression is satisfied:

$$-3.0<(R2+R1)/(R2-R1)<-0.01,$$

where R1 is a curvature radius of the object-side surface of the first negative lens, and R2 is a curvature radius of the image-side surface of the first negative lens.

6. The zoom lens according to claim 1, wherein an Abbe number of a material of the positive lens with reference to a d-line is smaller than an Abbe number of a material of the first negative lens with reference to a d-line and the following conditional expression is satisfied:

$$10<vdp<35,$$

where vdp is the Abbe number of the material of the positive lens with reference to the d-line.

7. The zoom lens according to claim 1, wherein the following conditional expression is satisfied:

$$1.60<ndp<2.10,$$

where ndp is a refractive index of a material of the positive lens with respect to a d-line.

8. The zoom lens according to claim 1, wherein the second negative lens consists of a resin material.

9. The zoom lens according to claim 1, wherein at least one of an object-side surface of the second negative lens and an image-side surface of the second negative lens has an aspherical shape.

10. The zoom lens according to claim 1, wherein the rear lens group consists of a second lens unit having a positive refractive power.

11. The zoom lens according to claim 1, wherein the rear lens group consists of a second lens unit having a positive refractive power and a third lens unit having a positive refractive power which are disposed in order from the object side to the image side.

12. The zoom lens according to claim 1, wherein the rear lens group consists of a second lens unit having a positive refractive power, a third lens unit having a negative refractive power, and a fourth lens unit having a positive refractive power which are disposed in order from the object side to the image side.

13. The zoom lens according to claim 1, wherein the rear lens group consists of a second lens unit having a positive refractive power, a third lens unit having a negative refractive power, a fourth lens unit having a positive refractive power, and a fifth lens unit having a negative refractive power which are disposed in order from the object side to the image side.

14. An image capturing apparatus comprising:
a zoom lens; and
an image sensor configured to receive light of an image formed by the zoom lens,
wherein the zoom lens includes a plurality of lens units, and an interval between adjacent lens units changes during zooming,
wherein the plurality of lens units consists of a first lens unit having a negative refractive power and a rear lens group, the rear lens group being disposed on an image side of the first lens unit, including one or more lens units, and having a positive refractive power as a whole,
wherein the first lens unit consists of a first negative lens, a second negative lens, and a positive lens which are disposed in order from an object side to the image side, and
wherein the following conditional expressions are satisfied:

$$2.00<SG1<3.60;$$

$$2.1<fG2/f1<20; \text{ and}$$

$$1.40<nd1<1.65,$$

where f1 is a focal length of the first lens unit, fG2 is a focal length of the second negative lens, SG1 is a specific gravity of the first negative lens, and nd1 is a refractive index of a material of the first negative lens with respect to a d-line.

15. The image capturing apparatus according to claim 14, wherein an effective image circle diameter at a wide-angle end is smaller than an effective image circle diameter at a telephoto end.

16. A zoom lens comprising a plurality of lens units configured such that an interval between adjacent lens units changes during zooming,
wherein the plurality of lens units consists of a first lens unit having a negative refractive power and a rear lens group, the rear lens group being disposed on an image side of the first lens unit, including one or more lens units, and having a positive refractive power as a whole,
wherein the first lens unit consists of a first negative lens, a second negative lens, and a positive lens which are disposed in order from an object side to the image side,
wherein the rear lens group consists of a second lens unit having a positive refractive power, a third lens unit having a negative refractive power, a fourth lens unit having a positive refractive power, and a fifth lens unit having a negative refractive power which are disposed in order from the object side to the image side, and
wherein the following conditional expressions are satisfied:

$$2.00<SG1<3.60; \text{ and}$$

$$2.1<fG2/f1<20,$$

where f1 is a focal length of the first lens unit, fG2 is a focal length of the second negative lens, and SG1 is a specific gravity of the first negative lens.

* * * * *